Nov. 8, 1938.   A. B. BUXBAUM   2,136,099
SALVAGING CONSTITUENTS OF AUTOMOBILE TIRES AND THE LIKE
Filed Sept. 10, 1937   2 Sheets-Sheet 1
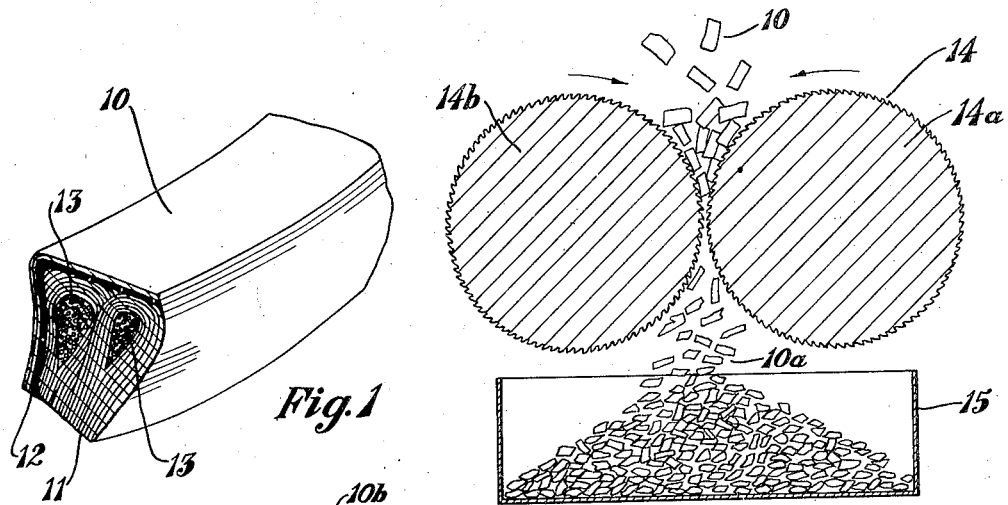
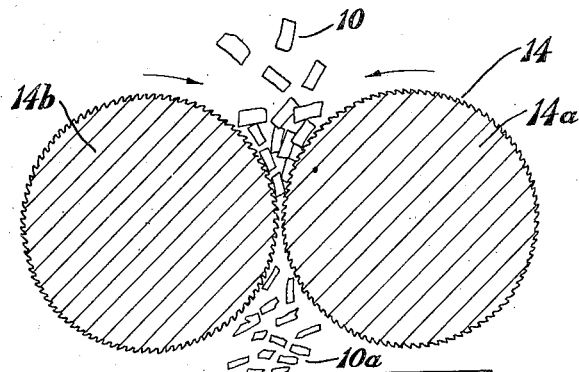
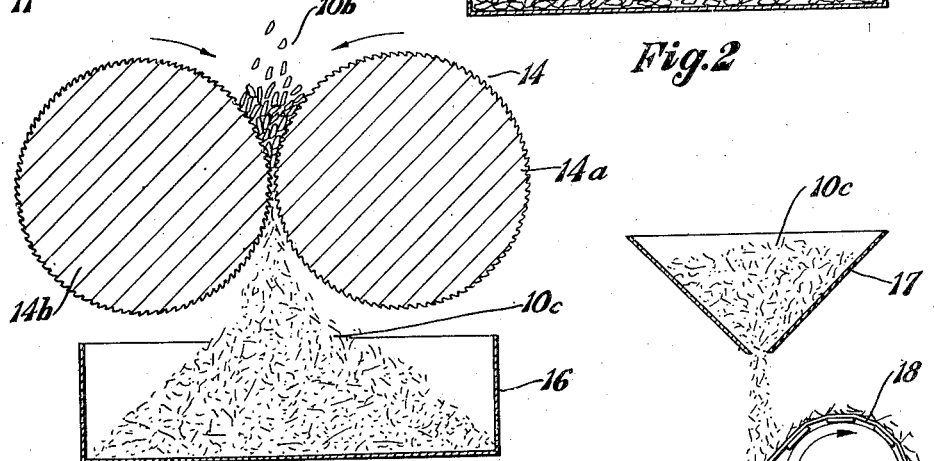
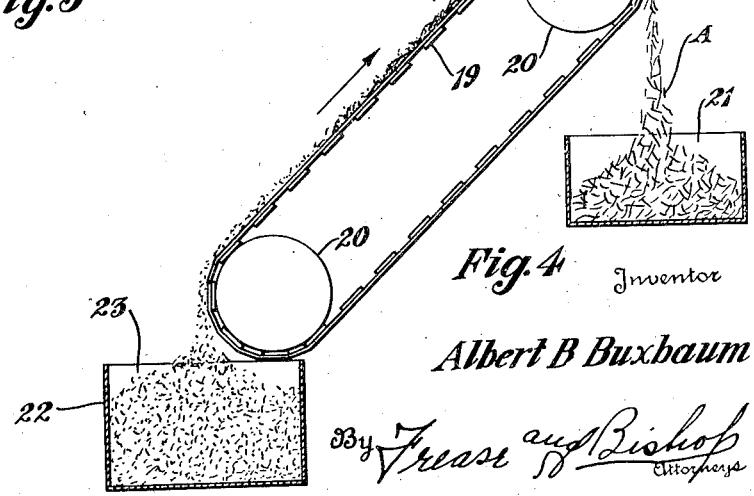
Inventor
Albert B Buxbaum
By Frease and Bishop
Attorneys

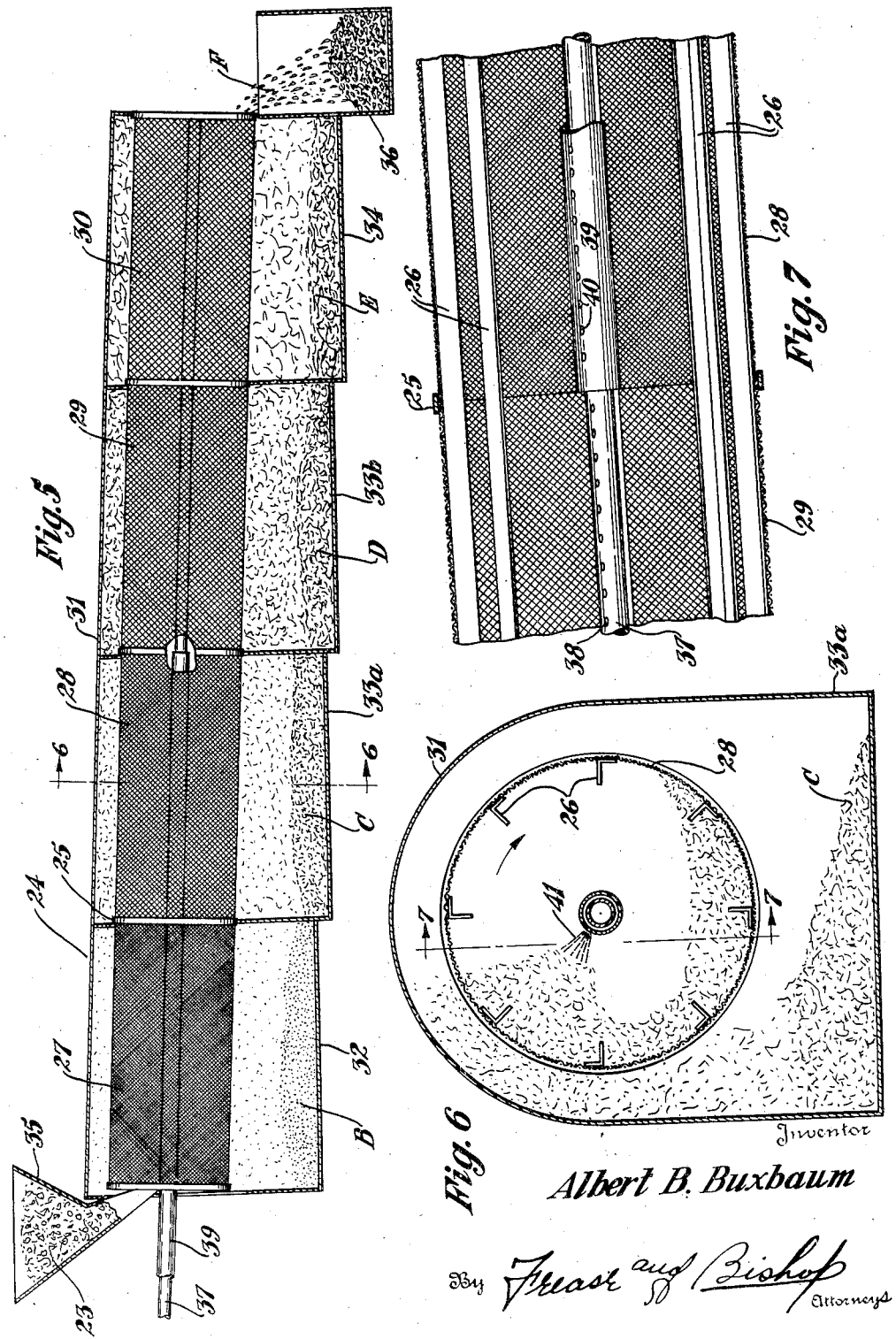

Patented Nov. 8, 1938

2,136,099

UNITED STATES PATENT OFFICE 2,136,099

SALVAGING CONSTITUENTS OF AUTOMOBILE TIRES AND THE LIKE

Albert B. Buxbaum, Akron, Ohio

Application September 10, 1937, Serial No. 163,205

14 Claims. (Cl. 209—2)

The invention relates to the salvaging of the constituent parts or materials contained in used automobile, bus, and truck tires, and the like, and more particularly to the salvaging of all of the constituent materials contained in the bead portion of used tires.

Various processes have been used for salvaging one or more of the constituent materials contained in used automobile tires; and some of these processes are expensive, others produce considerable waste, and still others only result in the salvaging of certain of the constituent materials.

All prior processes of salvaging involve the cutting off of the bead portions of the tire and, with one exception, so far as I am advised, the scrapping of such bead portions; because no adequate way of separating the bead wire, the rubber, and the fabric or fiber of such bead portions has been known. These bead portions are then usually destroyed by burning.

In the one exception noted, a portion of the rubber has been reclaimed from the bead portions of old tires by cracking the same open, by then mechanically pulling or prying the twisted wires as a unit loose from the fabric and impregnated rubber, and by then subjecting the remaining rubber and fabric to grinding, acid treatment and other operations with the result that a certain portion of the rubber may be reclaimed. In this process, the wire is coated with rubber, and has little value; and the fiber or fabric is lost through the acid treatment of the ground fabric and rubber.

The present improvements contemplate the salvaging of all of the rubber, fabric and wire in the bead portions of used automobile tires and the like; most, or all, of which have heretofore been destroyed or scrapped.

Thus, the raw material for the present process constitutes bead containing portions of automobile tires; and the products resulting from the practice of the new process of the present improvements constitutes rubber in a very convenient and useable state for reclaiming, various grades of fabric or fiber, and wire suitable for use as high grade scrap steel.

It is therefore an object of the present invention to provide a method of salvaging all of the constituent parts, elements or materials contained in used automobile tires and the like.

It is a further object of the present invention to provide an improved method of salvaging the constituent materials of the bead portions of used automobile tires and the like, by which the constituent elements may be readily separated one from another.

Moreover it is an object of the present invention to provide a new process for salvaging the constituent materials of the bead portions of used automobile tires and the like, by which the constituent elements are separated one from another and are in a very suitable, useable and convenient state for subsequent sale or use.

It is likewise an object of the present invention to provide a process for salvaging all of the constituent materials of the bead portions of used automobile tires and the like, in which the constituent materials are themselves used for breaking down and separating the materials, one from another.

And finally it is an object of the present invention to provide a process for salvaging all of the constituent materials of the bead portions of used automobile tires and the like, which may be very inexpensively carried out and which results in great savings and the avoidance of waste.

These and other objects may be obtained by the processes, methods, steps and procedures comprising the present invention, hereinafter described in detail and claimed, which may be stated in general terms as including, preferably severing bead containing portions from automobile tires and the like, cutting the severed bead containing portions into short lengths; passing said short lengths of bead which contain rubber, fabric impregnated with rubber, and twisted or braided or woven wire impregnated with rubber, through cracker rolls a number of times until the wire is separated into individual pieces and presents a polished appearance substantially clean and free of rubber, to produce a mixture of wire, and fabric and rubber in a finely divided state; preferably magnetically separating the wire from said mixture; and screening the resulting mixture of fabric and rubber to separate a major portion of the rubber therefrom and to size and grade the fabric.

Certain steps of the improved process are diagrammatically shown in the drawings, in which Figure 1 is a perspective view of a short length of automobile tire bead, the constituent materials of which are to be salvaged;

Fig. 2 is a diagrammatic view of cracker rolls showing short lengths of bead, as shown in Fig. 1, being passed therethrough;

Fig. 3 is a view similar to Fig. 2 showing how the material is repeatedly passed through cracker rolls until the constituent parts thereof are in a relatively finely divided state;

Fig. 4 is a diagrammatic view illustrating the magnetic separation of the wire, from the wire, fabric and rubber mixture resulting from the cracking or grinding steps illustrated in Figs. 2 and 3;

Fig. 5 is a diagrammatic longitudinal view, parts being broken away and in section, showing one form of screening device which may be used to separate, screen and size the rubber and fabric constituents of the chewed up material;

Fig. 6 is a cross-section taken on the line 6—6, Fig. 5; and

Fig. 7 is an enlarged sectional view looking in the direction of the arrows 7—7, Fig. 6.

Similar numerals refer to similar parts throughout the drawings.

In carrying out the present process, the bead portions of automobile tires and the like are severed from the remaining portions of the tire in the usual manner with a bead cutter. These severed annular bead portions are then cut into short lengths or sections, as illustrated in Fig. 1 at 10, which sections 10 are preferably from 4 to 12 inches in length. The bead sections 10 include rubber treated, impregnated and coated fabric indicated at 11, rubber layers 12, and one or more coils of twisted, braided, or cabled wire 13 which is also coated with and surrounded by rubber.

The bead sections 10 are then taken to cracker rolls indicated diagrammatically at 14 which may be of the usual construction and driven in the usual manner either with one roll 14a being driven at a different speed than the other roll 14b; or both rolls 14a and 14b may be driven at the same speed. The bead sections 10 after passing through the cracker rolls are collected below the same in a box or hopper 15, as indicated at 10a and the material 10a is repeatedly passed again and again through the cracker rolls until the material indicated at 10c in Fig. 3 results.

In repeating the passing of the material 10a through the cracker rolls, the cracker rolls may be adjusted closer together and may be speeded up for reasons which will be later explained.

The continued treatment of the material by repeatedly passing the same through the restricted trough space between the cracker rolls again and again grinds, crushes, chews or masticates the material and rubs, turns and twists the material between the rolls and other masses of the material so that the fabric constituent thereof acts as a cleaner in an abrasive-like manner to work and clean the rubber off the bead wire and to tear the bead wire apart, wire for wire. At the same time the bead wire in being repeatedly turned, twisted and ground between the cracker rolls, helps to cut or chew the fabric or cotton up into small pieces and separates substantially all of the rubber from the fabric.

The treatment of the material in the corrugated cracker rolls is continued until the wire is substantially free from rubber and is in a polished state; or until the fabric is substantially finely divided and the major portion of the rubber separated therefrom. Thus in Fig. 3, the entering material 10b is shown somewhat coarser than the final material 10c, but materially finer than the material 10a in Fig. 2.

The more the material is passed through the cracker rolls, the finer are the fabric and rubber constituents of the material 10c; and the faster the rolls are run the finer are the resulting rubber and fabric constituents thereof. The material 10c includes a mixture of clean wire, comminuted rubber, and fabric in various lengths.

The material 10c may be collected in a hopper or box 16 and then taken to a magnetic separator, one type of which is diagrammatically shown in Fig. 4.

In Fig. 4, the material 10c is placed in a hopper 17 from which it drops upon the upper end of an inclined endless belt 18 carrying magnets 19 and passing over sprockets 20 in the direction of the arrow. The magnets 19 are magnetized on the top side of the belt and as the material 10c drops upon the belt, the wires adhere to the belt and are carried over the top and drop into and are collected in a box or hopper 21 while the fabric and rubber constituents of the mixture 10c drop down the belt 19 and collect in the box or hopper 22.

The wire indicated at A in Fig. 4 may then be treated in any usual manner as by briquetting, baling or the like, and sold as a high grade steel scrap. The fabric and rubber indicated at 23 which results after separation of the wire, may then be screened in any desired type of screening device.

Referring to Figs. 5, 6 and 7, one form of rotary screening and grading device is indicated generally at 24 in which an inclined rotary screening container is utilized. The rotary screening container shown includes a skeleton shell comprising annular rings 25 and longitudinally extending angle members 26 upon which are mounted four screens 27, 28, 29 and 30 which may for example be $\frac{1}{16}$, $\frac{1}{8}$, $\frac{3}{16}$ and $\frac{1}{4}$ inch mesh screen; and the rotary screening container may be rotated in the direction of the arrow shown in Fig. 6 by any suitable means.

A shield 31 preferably extends full length along the rotary container along the rising side of the rotor and over the top thereof and four collecting boxes 32, 33a, 33b and 34 are provided, one for each screen size.

The rotary screen may be open at both ends and a hopper 35 may be provided to feed the material 23 in the upper end of the rotary screen. A collecting box 36 may be placed at the discharge end of the rotary screen.

A blower pipe preferably extends axially of the rotary screen throughout the length thereof and the same may comprise a single pipe 37 from which air under pressure is discharged at 38 upwardly at an angle toward the rising side of the rotary screen as it rotates to blow the screened material through the screen. As an alternative, the pipe 37 may be imperforate throughout the first half of its length, as shown, and may be surrounded by a pipe of larger diameter, best illustrated in Fig. 7 at 39.

Steam may be introduced into pipe 39 around pipe 37 throughout half of the length of the rotary screen and blown outward and upward through apertures 40 as indicated at 41 in Fig. 6. The steam not only functions to blow the material through the screen but also aids in cleaning or washing the fabric content of the material being screened. The steam pipe 39 in surrounding the first half of pipe 37 thus heats the air so that the hot air issuing in the last half of the rotary screen dries the material being screened in these sections, which has been washed or dampened by the steam in the preceding sections.

The rubber-fabric mixture resulting after the wire has been magnetically separated therefrom indicated at 23 in Fig. 4 is taken to the hopper 35 of the screening device, and is fed to the rotary screen wherein it is carried upward by the angles 26 as the rotary screening device turns and the steam or air in blowing therethrough drives particles of the material through the screen against shield 31 where the particles drop into the collecting hoppers therebelow.

The finest particles in the mixture 23 constitute rubber so that substantially all of the rubber will be screened out of the mixture at the first zone 27 and finally comminuted rubber is collected at B in hopper 32. At the next zone 28, the coarser particles of rubber are screened out together with the finer particles of fabric as indicated at C in Fig. 5.

At the next or third zone 29, coarser fabric particles are screened out together with the remaining few particles of rubber as indicated at D in Fig. 5; and in the fourth or last zone 30, the very coarse fabric particles are screened which are substantially free from rubber as indicated at E in Fig. 5.

Any particles that remain too coarse to pass through the screen, collect at F in hopper 36 and may be returned to the cracker rolls for being reground.

The finely divided or comminuted rubber B may be sold as rubber for reclaiming, and is in a very useable and highly desirable state for such use. The various grade and sizes of fabric C, D and E can be used for numerous purposes.

Of course it is understood that the invention is not limited to the use of the particular type of magnetic separator or in fact to the use of any magnetic separator; and is not limited to the use of the particular type or size of screener.

It is only necessary to provide some means for separating the wire, rubber and fabric constituents, one from another, of the bead portions 10 after they have been broken up, chewed or masticated into a mixture of the same by the repeated or continued passage, again and again, through the cracker rolls.

Accordingly, the new method of salvaging the constituent parts, particularly of the bead portions of automobile tires and the like, enables a saving of materials which sometimes constitute about 20% of the total material in a used tire, which have heretofore been scrapped, thrown away or burned up. Moreover, the new method can be very inexpensively carried out to separate the constituent materials in a very useable or salable condition.

It is to be understood that the scope of the invention is not limited to the particular lengths to which the bead portions are cut prior to being repeatedly passed through the cracker rolls, so long as the lengths of the bead portions are sufficiently short that a number of them can be passed through the cracker rolls at one time so as to work upon each other.

Moreover, the scope of the invention is not limited to the particular speed of the cracker rolls, or to the number of times the material is passed through the cracker rolls, so long as the chewing or mastication of the material in the cracker rolls is repeated and continued until the wires are freed from rubber and become polished, and so long as the fabric and rubber are substantially separated from each other and ground to the desired degree of fineness.

Likewise, the scope of the invention is not limited to severing the bead portions from used tires before cutting the same into short lengths, because it is to be understood that tires may be broken up directly into short lengths having bead containing portions, prior to being ground.

Similarly, it is to be understood that the grinding need not necessarily be carried out on "cracker rolls", as it is only necessary to roller grind or mechanically roller work wire, rubber and fabric containing material repeatedly until the wire lengths are freed from rubber, and until the fabric and rubber are substantially separated from each other and cut or ground to the desired degree of fineness.

Also, rubber and fabric may be salvaged from rubber and fabric containing material; within the scope of the present invention, by grinding such material in the presence of wire to the desired degree of fineness.

And finally, wire and rubber may be salvaged from rubber coated wire, within the scope of the present invention, by mechanically working the same in the presence of fabric until the wire is freed from rubber and presents a polished appearance.

Having now described the features of the invention, a preferred method of carrying out the same, and the advantages and results attained thereby; the new and useful steps, processes, methods and modes of operation, and reasonable mechanical equivalents thereof obvious to those skilled in the art, are set forth in the appended claims.

I claim:

1. The method of salvaging the constituent elements of the bead portions of automobile tires and the like containing wire, rubber and fabric which includes severing the bead portions from such tires, cutting the severed bead portions into short lengths, repeatedly roller grinding the short lengths until a mixture of wire, rubber and fabric is obtained and the wire is freed of rubber and polished, and then separating the wire, rubber and fabric, one from another.

2. The method of salvaging the constituent elements of the bead portions of automobile tires and the like containing wire, rubber and fabric, which includes severing the bead portions from such tires, cutting the severed bead portions into short lengths, repeatedly passing said short lengths through cracker rolls until the wire is freed of rubber and polished and until the rubber and fabric are in a finely divided state in a mixture with said wire, magnetically separating the wire from said mixture, and screening the rubber and fabric to separate the major portion of the rubber therefrom and to size and grade the fabric.

3. In a method of salvaging the constituent elements of the bead portions of automobile tires and the like containing wire, rubber and fabric, the steps of repeatedly passing bead containing portions between rolls to chew and grind the same and form a mixture of wire, rubber and fabric until the rubber and fabric are in a finely divided state, and then separating the wire, rubber and fabric, one from another.

4. In a method of salvaging the constituent elements of the bead portions of automobile tires and the like containing wire, rubber and fabric, the steps of passing bead containing portions again and again between corrugated rolls to chew and grind the same into a mixture of wire, rubber and fabric until the wire is freed of rubber and presents a polished appearance, and then separating the wire, rubber and fabric, one from another.

5. In a method of salvaging the constituent elements of the bead portions of automobile tires and the like containing wire, rubber and fabric, the steps of repeatedly mechanically working bead containing portions between rolls to cause the wire to cut and grind the fabric and rubber to a finely divided state, and then separating the wire, rubber and fabric, one from another.

6. In a method of salvaging the constituent elements of the bead portions of automobile tires and the like containing wire, rubber and fabric, the steps of repeatedly passing bead containing portions between rolls to cause the fabric to work upon and clean the rubber from the wire until the wire presents a polished appearance, and then separating the wire, rubber and fabric, one from another.

7. In a method of salvaging the constituent elements of the bead portions of automobile tires and the like containing wire, rubber and fabric, the steps of breaking up bead containing portions into short lengths, and repeatedly roller working the short lengths to cause the fabric to clean the rubber from the wire and to cause the wire to tear and cut the rubber and fabric until a mixture of polished wire and finely divided rubber and fabric is obtained, and then separating the wire, rubber and fabric, one from another.

8. In a method of salvaging the constituent elements of the bead portions of automobile tires and the like containing wire, rubber and fabric, the steps of repeatedly mechanically working bead containing portions between rolls to cause the wire to cut and grind the fabric and rubber to a finely divided state, separating the wire from the rubber and fabric, and then blowing the mixture of rubber and fabric against screens of different sized mesh to separate the rubber from the fabric and to size and grade the fabric.

9. In a method of salvaging the constituent elements of the bead portions of automobile tires and the like containing wire, rubber and fabric, the steps of repeatedly mechanically working bead containing portions between rolls to cause the fabric to work upon and clean the rubber from the wire until the wire presents a polished appearance, separating the wire from the rubber and fabric, screening the rubber from the fabric in the presence of steam to wash the fabric, and screening the fabric in the presence of hot air to dry, size and grade the fabric.

10. In a method of salvaging the constituent elements of the bead portions of automobile tires and the like containing wire, rubber and fabric, the steps of repeatedly roller crushing bead containing portions of a tire in a restricted space until the wire has cut and ground the fabric and rubber to a finely divided state, and then separating the wire, rubber and fabric, one from another.

11. In a method of salvaging the constituent elements of the bead portions of automobile tires and the like containing wire, rubber and fabric, the steps of roller crushing bead containing portions in a restricted space until the rubber is pulled from the wire and the wire presents a polished appearance, and then separating the wire, rubber and fabric, one from another.

12. In a method of salvaging the constituent elements of automobile tires and the like, the steps of repeatedly roller crushing tire portions in the presence of wire until the wire has cut and ground the tire fabric and rubber to a finely divided state, and then separating the wire, rubber and fabric one from another.

13. In a method of salvaging the bead wire of automobile tires and the like, the steps of repeatedly grinding rubber coated bead wire against tire fabric by passing bead containing tire portions through cracker rolls until the wire presents a polished appearance, and then separating the wire, rubber and fabric one from another.

14. In a method of salvaging the constituent elements of automobile tires and the like, the steps of repeatedly roller crushing and masticating tire bead portions containing wire in a restricted space, whereby the wire grinds the fabric and rubber to a finely divided state and the wire is cleaned and polished.

ALBERT B. BUXBAUM.